United States Patent Office 3,823,100
Patented July 9, 1974

3,823,100
POLYSACCHARIDE BASED FLOCCULANTS
Eric Rothwell, Bradford, and Graham Smalley, Huddersfield, England, assignors to Allied Colloids Limited, Bradford, Yorkshire, England
No Drawing. Filed Mar. 5, 1973, Ser. No. 337,987
Claims priority, application Great Britain, Mar. 13, 1972, 11,618/72
Int. Cl. C08h 7/00
U.S. Cl. 260—6         8 Claims

ABSTRACT OF THE DISCLOSURE

A substituted polysaccharide is described which is water soluble and which is of use as, for example, a flocculant. The substituent groups are N(amino methyl)propionamide groups and may be monomeric or polymeric.

---

It is well known to use high molecular weight water soluble polyelectrolytes as flocculating agents, coagulating agents and conditioning agents in order to promote aggregation of solid particles suspended in an aqueous medium or to induce separation of the solids in an aqueous suspension from the water present, prior to a physical step of water removal by such processes as decantation, flotation and filtration.

Flocculating agents in use today tend to be selected from classes comprising polymers and copolymers of monomers such as acrylamide, acrylic acid, cationic esters of acrylic acid and methacrylic acid, vinyl pyridines and styrene sulphonic acids. Such materials are capable of yielding a whole range of polyelectrolytes suitable as flocculating agents and which includes reagents which are nonionic, cationic, anionic and amphoteric in character. These products cover a broad spectrum of flocculant applications for example assisting the dewatering of e.g. mineral suspensions, the conditioning of sewage sludges, effluent treatments, potable water clarification and as retention acids and dewatering aids for paper.

In addition to these synthetic materials, many varieties of natural based products are used as flocculants. Examples are starches, including modified starches including certain cationic and anionic modifications, vegetable gums and animal glues.

In selecting a particular flocculant for a particular application few theoretical considerations can be brought into consideration and selection is to a great extent empirical. Besides economic and efficiency considerations other factors which are often brought into consideration include the relative degree of toxicity, the biodegradability, ease of handling, and floc stability. It is a fact that a very large number of flocculants having very diverse chemical compositions are used today and they tend to be selected for a particular purpose because of the relative importance of one or more of the above mentioned factors.

Polysaccharide based flocculants, including chemically modified polysaccharides, have found particular use when intrinsic low cost, freedom from toxicity, low biological persistence and low floc strength are required properties. Cationic starches have found particular value in the paper industry as retention aids because in addition to their utility as flocculants at low intrinsic cost, they contribute to certain desirable properties of the finished paper such as strength and size retention, and they generally avoid critical flocculating conditions at the sheet formation stage. Cationisation of starch has hitherto been effected for instance by introduction of units comprising aziridine 1,2-epoxy-3-amino propanes or β-halo alkylamines as is indicated in, for example, U.S. Pats. Nos. 3,464,974; 2,876,217 and 2,970,140.

The object of this invention is to present a new class of compounds which are cationically modified polysaccharides and which have a wide spectrum of action and which retain the essential benefits ascribed to polysaccharide based flocculants generally and which show very valuable properties with several specific substrates.

The products of the invention are water soluble polyelectrolytes characterised by the presence of N(amino methyl)propionamide groups each of which is attached to the polysaccharide through an ether linkage.

"Water soluble" as used herein denotes products which give true or colloidal solutions when present in aqueous media.

The products preferably have the general formula:

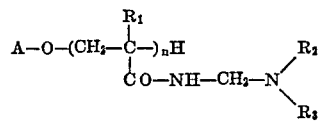

where $n$ is 1 or a higher number, A is the polysaccharide, $R_1$ is H or $CH_3$, and $R_2$ and $R_3$ are the same or different and can be H or lower alkyl groups or hydroxy lower alkyl groups or together form an alkylene chain whereby a heterocyclic radical is formed with the nitrogen atoms, the radical preferably having 4 to 6 carbon atoms in the ring. Any lower alkyl, or hydroxy lower alkyl, groups usually contain 1 to 8 carbon atoms, preferably 1 to 4 and most preferably 1, 2 or 3 carbon atoms.

The N(amino methyl)propionamide groups may be present in free base form or may be neutralised or partly neutralised by the presence of organic or inorganic acids insofar as these do not give rise to insolubility of the product under its condition of use, or the basic group may be partially or wholly in the form of the quaternary ammonium salt as a result of alkylation with an alkylating agent such as methyl chloride or bromide, dimethyl sulphate, or diethyl sulphate. Thus any such alkyl group will usually contain 1 to 8 carbon atoms, preferably 1 to 4 and most preferably 1, 2 or 3 carbon atoms.

The polysaccharide chain A will of course contain more than one N(amino methyl)propionamide group substituted into it. Usually some at least, and in many cases all, of the N(amino methyl)propionamide groups are monomeric groups ($n=1$), but some or all can be polymeric groups containing 2 or more recurring N(amino methyl) propionamide groups.

The degree of substitution of monomeric (and/or polymeric) groups can vary over quite wide ranges, the theoretical maximum being 3. The most useful results have been obtained with degrees of substitution ranging from 0.1 to 0.7 but it is easily possible to obtain lower or higher degrees of substitution if desired.

The N(amino methyl)propionamide groups may be substituted onto monosaccharide moieties which are either distributed along the main chain of the polysaccharide or which are in side chains.

A wide variety of polysaccharides can be substituted in accordance with the invention. Examples of suitable polysaccharides are guar gum, gum arabic, cellulose and starch, the last two being preferred because of their price. In particular starch is preferred and we find that a wide variety of starches can be used in the invention. Typical starches that we use are maize starch and potato starch. The polysaccharide does not have to be a raw material but can instead be pretreated in some manner, for example it may already be substituted or, more usually, it may be pregelatinised.

The products of the invention are usually made by first causing acrylamide or methacrylamide to react with hydroxyl groups in the polysaccharide, for example in the manner described in U.S. Patent Specification No. 3,101,-330 to produce polysaccharide substituted by propionamide groups, and then aminomethylating these groups, according to the reaction schemes

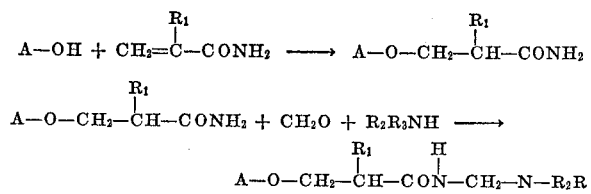

An alternative, that is generally less satisfactory, is to aminomethylate the acrylamide or methacrylamide and then to react this onto the polysaccharide. These processes all give monomeric substituents in the polysaccharide.

In the preferred process the reaction between the acrylamide or methacrylamide and polysaccharide is preferably conducted at elevated temperature in an aqueous medium that is alkaline. The pH is preferably at least 10, usually 11 to 11.5. The reaction temperature is usually from 40 to 60°. The reaction is normally conducted for at least 6 hours, for example 8 to 28 hours. The preferred reaction conditions we use are a temperature of 50° C., a pH of 11.2 and a duration of about 12 hours.

At these conditions the nature of the polysaccharide and the proportion of acrylamide (or methacrylamide) to starch (or other polysaccharide) controls the degree of substitution. For example if a degree of substitution of 0.1 is required then it is satisfactory to have a molar ratio of acrylamide (or methacrylamide): anhydroglucose units of from 0.1:1 to 0.5:1 while if higher degrees of substitution, for example 0.7, are required then higher ratios, for example up to 3:1, may be needed. The degree of substitution is greater if the starch is in solution throughout the reaction and so it is preferred that the starch should be pregelatinised or that it should be heated above its gelatinisation temperature before the reaction with the acrylamide or methacrylamide. The degree of substitution can also be increased by, for example, increasing the temperature or increasing the duration of the reaction.

The product from the reaction may include unreacted acrylamide or methacrylamide, particularly if an excess of this material was introduced initially. In some instances this can be left in the product as the monomer but in others this is undesirable. In this case the substituted polysaccharide may be separated from the monomer (either before or after aminomethylation) in conventional manner, for example by precipitation by adding a non-solvent such as methanol followed by solution in water of the precipitate.

In another method, acrylamide or methacrylamide monomer remaining in the reaction mixture after the reaction with the polysaccharide is, before the mixture is subjected to aminomethylation, graft polymerised onto the polysaccharide. This is achieved by adding an initiator for graft polymerisation to the mixture and then subjecting the mixture to standard polymerisation conditions.

As a result some or all of the monomeric substituents may be polymerised by graft polymerisation of unreacted monomer, and polymerised monomer may be grafted onto unreacted hydroxyl groups, thereby increasing the degree of substitution.

Typical graft polymerisation initiators that may be added for this purpose include redox systems such as ceric ammonium nitrate and ferrous sulphate ammonium persulphate redox initiators.

The aminomethylation is carried out in standard manner, for example by reaction with formaldehyde and an amino compound, preferably under alkaline conditions.

The reaction mixture resulting from this may be utilised without any subsequent treatment such as purification, concentration or dilution since the proportions of reactants in the aqueous reaction medium are generally such that the product is obtained as a 2 to 20% solution, most usually as a 5 to 15% solution, and these are convenient concentrations for commercial use. For use as flocculants they are preferably diluted to, for example, 0.1%.

The products of the invention are of particular value as flocculants. Thus a suspension may be flocculated by incorporating them in the suspension. They are used in small amounts, for example 0.01 to 1%, usually 0.05 to 0.5%, based on the weight of suspended solids. They are generally used by adding them as a solution to the suspension to be treated with mild agitation whereupon the resulting flocculated suspension may be dewatered by a decantation, flotation or filtration step.

The products are useful in the dewatering of, for example, mineral suspensions, as retention aids and dewatering aids for paper, in which event they are added to the paper fibre suspension before its formation into paper, and as flocculants for water containing sewage, for example for the conditioning of sewage sludges or for effluent treatment, or for potable water clarification. The particular advantage of the products of the invention is that although they do not in every instance have as good an activity as some of the synthetic polyelectrolytes that are available, such as cationic polyacrylamides and modified polyethylene imines, they are very much cheaper than these and yet do have a very satisfactory degree of activity and have utility in a wide range of fields. Thus they are to be preferred to most if not all synthetic polyelectrolytes because they are cheaper without being unacceptably less active and sometimes are more active, and they are preferred to the relatively cheap polysaccharide polyelectrolytes that are available because they are much more active without being unacceptably more expensive.

The following are some examples.

EXAMPLE I

A propionamide starch ether was prepared by allowing 20 g. of potato starch to react with 21.3 g. of acrylamide in 300 cc. of water containing 0.4 g. of sodium hydroxide, for 24 hours at 50° C. The reaction mixture was neutralised with hydrochloric acid, and solid product precipitated by methanol addition, filtered and dried. This is denoted as Product A in the examples below. The product had a nitrogen content of 2.1% indicating a degree of substitution of 0.294.

5 gms. of Product A are dissolved in 30 cc. of water, 2 cc. of dimethylamine and 1.69 cc. of 28% formaldehyde solution are added and the mixture after diluting to 40 g. weight was heated for 16 hours at 40° C. and then allowed to cool. This is denoted as Product B in the examples below.

EXAMPLE II

Flocculation of Kaolinite

Sedimentation rates were measured in feet per hour after flocculation of 2% Kaolinite suspensions by addition of 0.1% active content solutions of Product B and unmodified potato starch. The results are:

| P.p.m. flocculant on clay | 0 | 100 | 300 | 500 | 1,000 |
|---|---|---|---|---|---|
| Potato starch | 1.02 | 1.12 | 1.23 | 1.40 | |
| Product B | 1.17 | 2.26 | 4.92 | 10.00 | 31.60 |

From these results it can be seen that Product B achieves a very useful increase in settling rate.

EXAMPLE III

Dewatering of Cellulose Fibre Slurry

An 0.2% slurry of repulped newsprint and waste paper was treated with small quantities of solutions of various reagents by mixing under conditions of good agitation. Included in the tests were Products A and B from Example I above and the starch from which these products were prepared. Also included were two commercially utilised dewatering reagents one of which was based on polyethylene imine and the other was a cationic polyacrylamide. The dewatering characteristics of the reagents were expressed as the increase in "Freeness" of the slurry as measured on a Schopper-Riegler Freeness tester according to the procedure described in "A Laboratory Hand Book of Pulp and Paper Manufacture" by Julius Grant 2nd Edition.

In this device, that water which is capable of draining "freely" from the slurry after filtration through a gauze is caused to collect in a specially calibrated measuring vessel. Amongst other things the freeness measurement so obtained gives an indication of the speed with which water will be discharged in the early dewatering stages of a paper or board machine and a high rate of discharge is a desirable property in relation to the production rate of the paper or board.

In this test a low Schopper-Reigler value (° SR) is obtained by a high volume of water collected in the vessel and indicates a high degree of "Freeness" or water drainage rate, and vice versa. The results obtained are:

| Product | Dosage (parts active product per 1,000 parts dry fibre) | Freeness, °SR |
|---|---|---|
| No addition | | 47-48 |
| Potato starch | 0.5 | 49 |
| | 2.5 | 42 |
| Product A | 0.5 | 46 |
| | 2.5 | 49 |
| Product B | 0.5 | 30 |
| | 2.5 | 20 |
| Modified polyethyleneimine | 2.5 | 27 |
| Cationic polyacrylamide | 2.5 | 19 |

From these it can be seen that the cationic starch of the invention performs as an extremely useful dewatering aid.

EXAMPLE IV

Dewatering of Sewage Sludge

The products of Example I were evaluated as sewage sludge dewatering aids by adding them in various doses, as 0.1% solutions, and with gentle agitation to a municipal sewage sludge having a solids content of 7.4%. The degree of coagulation achieved was determined by measuring the dewatering tendencies of the sludge, using the "Capillary suction time" (C.S.T.) test as described in the Ministry of Technology Techlink No. 632, August 1970. In this test the time is measured for the withdrawal of liquid from the sludge mass by the capillary action of an absorbent paper. A low C.S.T. value indicates a fast water release from the sludge and thereby gives an indication of the filtrability of the sludge in a large scale dewatering application.

For this particular sludge a C. S. T. value of 200 seconds or less indicates a good degree of conditioning of the sludge in preparation for a filtration process. The results are:

| Product | Dosage as percent active product on sludge solids | C.S.T. (seconds) |
|---|---|---|
| No addition | | 620 |
| Product A | 0.28 | 407 |
| Product B | 0.07 | 200 |
| | 0.14 | 167 |
| | 0.28 | 125 |

From these it can be seen that the Product B of the invention exerts a powerful conditioning effect on the sewage sludge.

EXAMPLE V

A solution of 75 g. pregelatinised maze starch and 170 g. acrylamide in 560 mls. water, containing 1.4 g. sodium hydroxide, was allowed to react for 6 hours at 50° C. to give a degree of substitution of 0.6. After neutralisation with 4 mls. conc. hydrochloric acid the solution at 50° C. was sparged with nitrogen, and then initiated with 40 mls. of a solution of 0.1 molar ceric ammonium nitrate and 1 molar nitric acid. The temperature rose during the course of the polymerisation to 75° C. When polymerisation was complete, 4.9 litres water were added followed by 180 g. 60% dimethylamine solution and 200 g. 36% formaldehyde solution, and the reaction allowed to proceed at ambient temperature to give a 6.2% solution denoted as Product C.

EXAMPLE VI

The performance of Product C in dewatering sewage was evaluated in comparison with a commercially utilised cationic polyacrylamide by the test method as used in Example IV, but on a municipal sewage sludge from a different source.

| Product | Dosage (ml. 0.1% solution per 100 ml. sludge) | C.S.T. (seconds) |
|---|---|---|
| No addition | | 895 |
| Product | 5 | 19 |
| Cationic polyacrylamide | 5 | 68 |
| | 10 | 19.7 |

This shows that Product C of the invention exerts a very powerful conditoning effect on sewage sludge and, while still being a relatively low cost material, is in fact more active than commonly used wholly synthetic polyelectrolyte.

We claim:

1. A water soluble product which is a polysaccharide substituted by N(amino methyl)propionamide groups each of which is attached to the polysaccharide through an ether linkage.

2. A polysaccharide according to claim 1 having the formula:

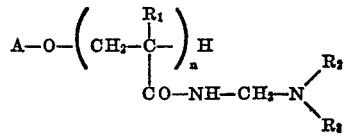

where $n$ is 1 or a higher number, A is the polysaccharide, $R_1$ is H or $CH_3$ and $R_2$ and $R_3$ are the same or different and are hydrogen, $C_{1-8}$ alkyl or hydroxy $C_{1-8}$ alkyl or together form an alkylene chain of 4 to 6 carbon atoms.

3. A polysaccharide according to claim 2 in which $R_2$ and $R_3$ are each hydrogen, methyl or ethyl.

4. A polysaccharide according to claim 2 in which $R_1$ is hydrogen

5. A polysaccharide according to claim 2 in which $R_1$ is hydrogen and $R_2$ and $R_3$ are both methyl.

6. A polysaccharide according to claim 2 in which all the N(amino methyl) propionamide substituents are monomeric.

7. A polysaccharide according to claim 2 having a degree of substitution of 0.1 to 0.7.

8. A polysaccharide according to claim 2 wherein A is a polysaccharide selected from the group consisting of guar gum, gum arabic, cellulose and starch.

References Cited

UNITED STATES PATENTS 3,101,330  8/1963  Paschall et al. _____ 260—233.3

MELVYN I. MARQUIS, Primary Examiner

U.S. Cl. X.R.

106—213; 210—42; 260—17.3, 17.4 ST, 209 R, 209.5, 209.6, 212, 233.3 R, 233.5